(12) United States Patent
Wada

(10) Patent No.: US 7,159,193 B2
(45) Date of Patent: Jan. 2, 2007

(54) DIGITAL IMAGE RECEIVING APPARATUS

(75) Inventor: Tetsuya Wada, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 582 days.

(21) Appl. No.: 10/230,883

(22) Filed: Aug. 29, 2002

(65) Prior Publication Data

US 2003/0046167 A1    Mar. 6, 2003

(30) Foreign Application Priority Data

Sep. 5, 2001    (JP) .............................. 2001-268956

(51) Int. Cl.
*G06F 17/00*    (2006.01)

(52) U.S. Cl. ........................ 715/838; 715/788; 715/765

(58) Field of Classification Search ................ 715/765, 715/771, 783, 810, 526, 815, 838, 788, 517; 705/16, 27; 382/275, 232
See application file for complete search history.

(56) References Cited

U.S. PATENT DOCUMENTS

| | | | | |
|---|---|---|---|---|
| 6,014,170 | A * | 1/2000 | Pont et al. ................ | 348/231.4 |
| 6,483,602 | B1 * | 11/2002 | Haneda ...................... | 358/1.16 |
| 6,618,082 | B1 * | 9/2003 | Hayashi et al. ........ | 348/231.99 |
| 6,701,845 | B1 * | 3/2004 | Ohmura ...................... | 101/484 |
| 6,775,407 | B1 * | 8/2004 | Gindele et al. ............. | 382/166 |
| 6,821,034 | B1 * | 11/2004 | Ohmura ........................ | 400/76 |
| 2001/0048774 | A1 * | 12/2001 | Seki et al. .................. | 382/305 |
| 2002/0067500 | A1 | 6/2002 | Yokomizo et al. | |

| | | |
|---|---|---|
| 2003/0184792 A1 | 10/2003 | Oliver |

FOREIGN PATENT DOCUMENTS

| | | |
|---|---|---|
| EP | 0 878 956 A1 | 11/1998 |
| GB | 2352355 A | 1/2001 |
| JP | 08-063486 | 3/1996 |
| JP | 2000-312334 | 11/2000 |
| JP | 2001-160103 | 6/2001 |

* cited by examiner

*Primary Examiner*—Tadesse Hailu
(74) *Attorney, Agent, or Firm*—Fulbright & Jaworski L.L.P.

(57) ABSTRACT

A digital image receiving apparatus includes a media drive (11) for reading image information from a storage medium (M1), an image information processing unit (22) for processing the image information to display a plurality of images in the image information read by the media drive, in thumbnail image form on a display (12), an order information processing unit (24) for creating order information including which images to be printed from a printing order given by a customer for each thumbnail image displayed on the display (12), a thumbnail image determining unit (22c) and a thumbnail image creating unit (22d). The thumbnail image determining unit (22c) determines whether thumbnail image data included in the image information is appropriate as thumbnail image data for display on the display (12). The thumbnail image creating unit (22d) creates thumbnail image data for display from the thumbnail image data for the image information with the thumbnail image data determined appropriate by the thumbnail image determining unit, and creates thumbnail image data for display from fill-size image data included in the image information for the image information with the thumbnail image data determined inappropriate by the thumbnail image determining unit.

2 Claims, 12 Drawing Sheets

FIG.6

RECEIPT

Customer Name
○○○○
Telephone No.
012-345-6789
Reception No.:R0000029
Terminal ID   :CT01
Date of Reception :2001.08.02

| Order No. | Size: L |
|---|---|
| ord0001 | |

30 yen X 40 prints                    ¥1200
Basic fee                                    ¥300
Consumption Tax 5.000%       ¥75

Total                                           ¥1575

Please take this receipt
to our service counter.

ABC Cameras
Umehara, Wakayama
TEL012-987-6543

COPY FOR CUSTOMER

Customer Name
○○○○
Telephone No.
012-345-6789
Reception No.:R0000029
Terminal ID   :CT01
Date of Reception :2001.08.02

| Order No. | Size: L |
|---|---|
| ord0001 | |

30 yen X 40 prints                    ¥1200
Basic fee                                    ¥300
Consumption Tax 5.000%       ¥75

Total                                           ¥1575

ABC Cameras
Umehara, Wakayama
TEL012-987-6543

FIG.11

Order Contents Confirm Screen

Please confirm contents of the order.

| Customer name: | Date of reception Tel. No. | | | | |
|---|---|---|---|---|---|
| Reception No. | Particulars | Size | Unit price | Quantity | Charge |
| | printing | L | 30 | 40 | 1200 |
| | basic charge | | 300 | | 300 |
| | consumption tax | | | | |
| | | | | | |
| | | | | total | 1575 |

12(13)

stop   return   OK

DIGITAL IMAGE RECEIVING APPARATUS

BACKGROUND OF THE INVENTION

1. Field of the Invention

This invention relates to a digital image receiving apparatus having media drives for reading image information from storage media, an image information processor for processing the image information to display a plurality of images of the image information read by the media drives in thumbnail image form on a display, and an order information processor for creating order information including particulars of prints from an order given by a customer for prints of the respective thumbnail images displayed on this display.

2. Description of the Related Art

A digital image receiving apparatus constructed as described above is disclosed in Japanese Patent Publication (Unexamined) 2001-160103, for example. When a medium storing image information acquired with a digital camera is set to this receiving apparatus, a liquid crystal screen forming part of the receiving apparatus displays, in thumbnail images, the image information stored in the medium. The liquid crystal screen includes a touch panel by means of which the operator can input order information relating to a printing order i.e. which images should be printed. After printing information including the image information and order information is inputted, the apparatus prints a copy of the order to be given to the customer. A photo processing shop receives the copy of the order from the customer, and transmits the printing information from the receiving apparatus to a printing apparatus through a data transmission network. The printing apparatus uses the image information included in the printing information successively transmitted from the receiving apparatus, to form its copy images on silver bromide printing paper. As a rule, such receiving apparatus is operated by the customer, to contribute to labor saving at the photo processing shop.

Such a digital image receiving apparatus creates thumbnail images from the image information inputted by the customer. The customer, while looking at the small thumbnail images displayed on the display, makes an order for prints by selecting image information to be printed and setting the numbers of prints. It is of course important the thumbnail images are distinctly displayed in a table. In order not to keep the customer waiting, it is also necessary to minimize the time taken from setting of a medium until the thumbnail images appearing on the display.

The apparatus disclosed in the patent publication noted above displays thumbnail images as follows. When image information stored in a medium includes full size image data, or image data proper, and thumbnail image data of smaller amount of data than the full-size image data (i.e. reduced image data), the thumbnail image data included in the image information is used to display thumbnail images in a table. When no thumbnail image data is included, thumbnail image data is created from the full-size image data to display thumbnail images in a table.

However, thumbnail images included in image information (generally called image file) are of variable sizes depending on programs used to create the image information. For example, different digital cameras that create image files in time of photography provide different size thumbnail images. Certain types of digital cameras produce very small thumbnail images suited for display on their small liquid crystal screens. Thus, even though thumbnail images are included in the image information, such images may be extremely obscure when displayed on the display of the digital image receiving apparatus. Conventionally, therefore, whether or not thumbnail image data is included in image information, thumbnail image data is always created from fill-size image data for display. However, it is time-consuming to expand, in memory, full-size image data having a very large image data size, and then create thumbnail image data therefrom. The customer may be irritated by the time taken from setting of the medium until thumbnail images appear on the display.

SUMMARY OF THE INVENTION

The object of this invention is to provide a digital image receiving apparatus having functions to display thumbnail images in a size distinct to the eye and in a short time after setting of a storage medium.

The above object is fulfilled, according to this invention, by a digital image receiving apparatus as noted in the outset hereof, wherein a thumbnail image determining unit is provided for determining whether thumbnail image data included in the image information is appropriate as thumbnail image data for display on the display, and a thumbnail image creating unit is provided for creating thumbnail image data for display; and the thumbnail image creating unit creates thumbnail image data for display from the thumbnail image data for the image information with the thumbnail image data determined appropriate by the thumbnail image determining unit, and creates thumbnail image data for display from full-size image data included in the image information for the image information with the thumbnail image data determined inappropriate by the thumbnail image determining unit.

In this construction, thumbnail image data for display is not necessarily created from full-size image data proper included in the image information. Thumbnail image data included in the image information is not always used as it is as thumbnail image data for display. Whether the thumbnail image data included in the image information is suitable for display on the display of this apparatus is determined. Only the thumbnail image data that satisfies a predetermined condition is used as thumbnail image data for display. For the image information with thumbnail image data not suitable for display on the display of this apparatus, full-size image data included therein is used. As a result, the apparatus can display thumbnail images on the display in a size distinct to the eye and in a short time after setting of a storage medium.

Most image information created by digital cameras includes thumbnail image data. However, no thumbnail image data may be included, and image information such as in TIFF format or bitmap format includes no thumbnail image data. Thus, as one preferred embodiment of this invention, it is proposed that, when the image information processing unit determines that no thumbnail image data is included in the image information, the thumbnail image creating unit creates thumbnail image data for display from the full-size image data included in the image information. A high-end digital camera in particular has functions to create image information in TIFF format. Thus, one medium could include a mixture of TIFF format and JPEG (Exif-JPEG being in wide use for digital cameras) format. That is, image information including thumbnail image data and image information without thumbnail image data may be stored on one medium. By employing this embodiment, various types of image information may all be displayed in thumbnail image form.

In a further preferred embodiment of this invention, the thumbnail image determining unit determines thumbnail image data having at least a predetermined display size set beforehand to be appropriate, the thumbnail image creating unit creating thumbnail image data for display by thinning out thumbnail image data exceeding the predetermined display size. That is, image data smaller than a suitable display size for display on the display needs an interpolation process to become the display size. Such image data is dismissed as unavailable since image quality is remarkably lowered when an interpolation is applied to small-size image data such as thumbnail image data. Image data larger large than the suitable display size needs a thinning-out process to become the display size. Since thinning-out process does not lower image quality, such thumbnail image data is used positively. In any case, since thumbnail image data has a far smaller image data size than full-size image data, thumbnail image data for display may be created in a short time.

Where the number of thumbnail images displayed at a time on the display is selectable as desired, generally, the fewer thumbnail images are displayed, the larger thumbnail images are. It is therefore advantageous to provide a construction in which the thumbnail image determining unit varies a criterion for determining whether the thumbnail image data is appropriate, according to the number of thumbnail images to be displayed on the display at a time.

Other features and advantages of this invention will be apparent from the following description of the embodiment to be taken with reference to the drawings.

BRIEF DESCRIPTION OF THE DRAWINGS

FIG. 6 is an explanatory view of a receipt issued by the receiving apparatus;

FIG. 11 is a view of a display screen showing one example of operating screen in time of receiving an order.

DESCRIPTION OF THE PREFERRED EMBODIMENT

An embodiment of this invention will be described hereinafter with reference to the drawings.

Figure 1:
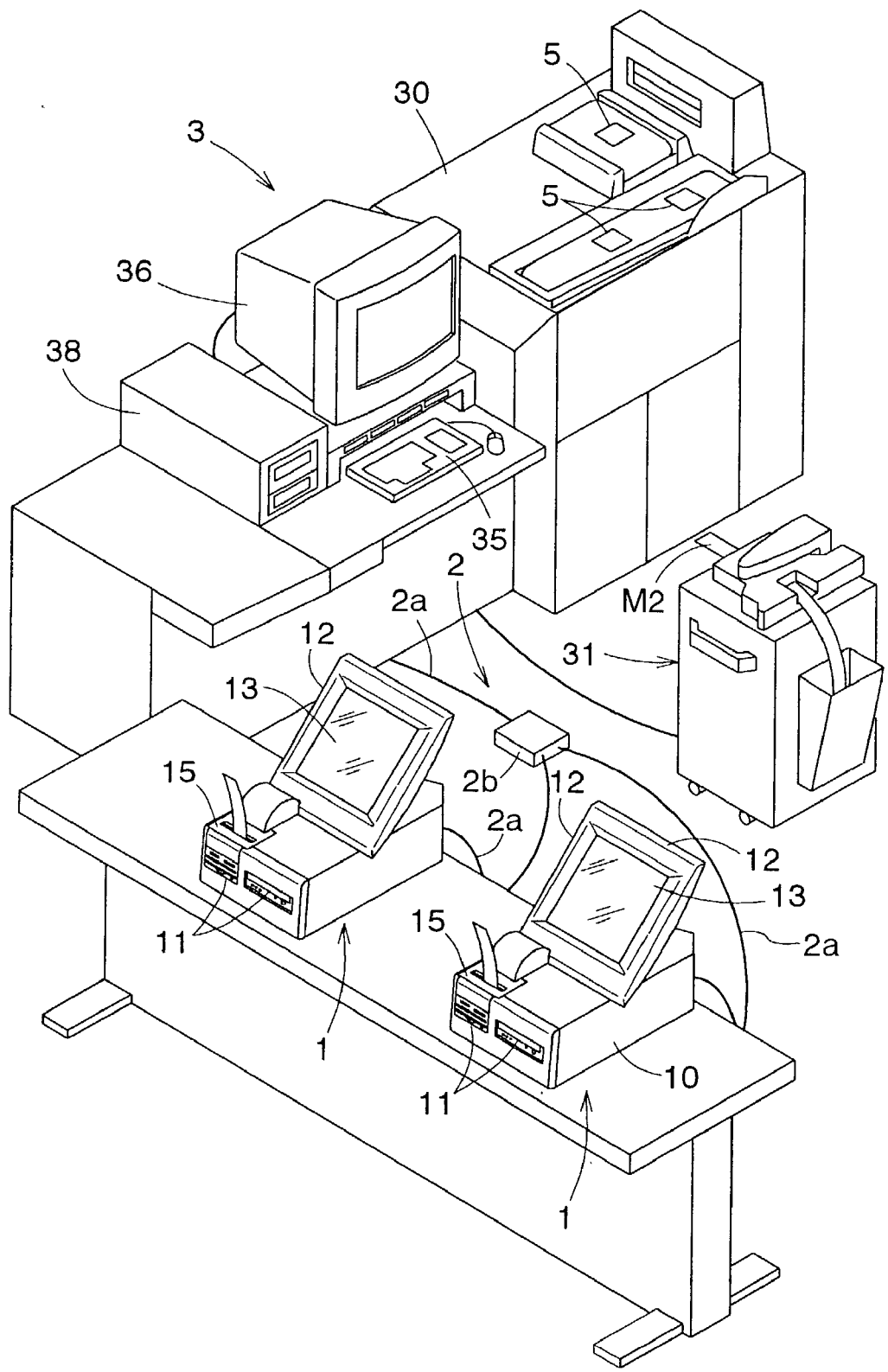
FIG. 1 is a perspective view showing an outward appearance of a printing system employing digital image receiving apparatus according to this invention.

As shown in FIG. 1, a printing system includes a plurality of digital image receiving apparatus (hereinafter simply called receiving apparatus) 1 connected through a data transmission network 2 to a digital type photo printing apparatus 3 for printing image information on silver bromide printing paper 5 serving as recording sheets. This printing system is constructed by adding, to the existing photo printing apparatus 3 of a photo processing shop, a network 2 including Ethernet cables 2a and a hub 2b and two receiving apparatus 1. The receiving apparatus 1 receive image information to be outputted as prints from storage media M1 such as Smart Media and CompactFlash storing image information acquired with digital cameras, and CD-ROMs and MOs storing image information made by individuals, and order information including the numbers of prints to be outputted. A customer shows a receipt issued when an order is received, to a shop assistant at the counter of the photo processing shop. Based on order information recorded on the receipt, the shop assistant operates the photo printing apparatus 3 to fetch, through the network 2, relevant printing information including image information and order information temporarily stored in one of the receiving apparatus 1. Based on this printing information, the photo printing apparatus 3 outputs prints 5 to be handed to the customer.

[Receiving Apparatus]

Figure 2:
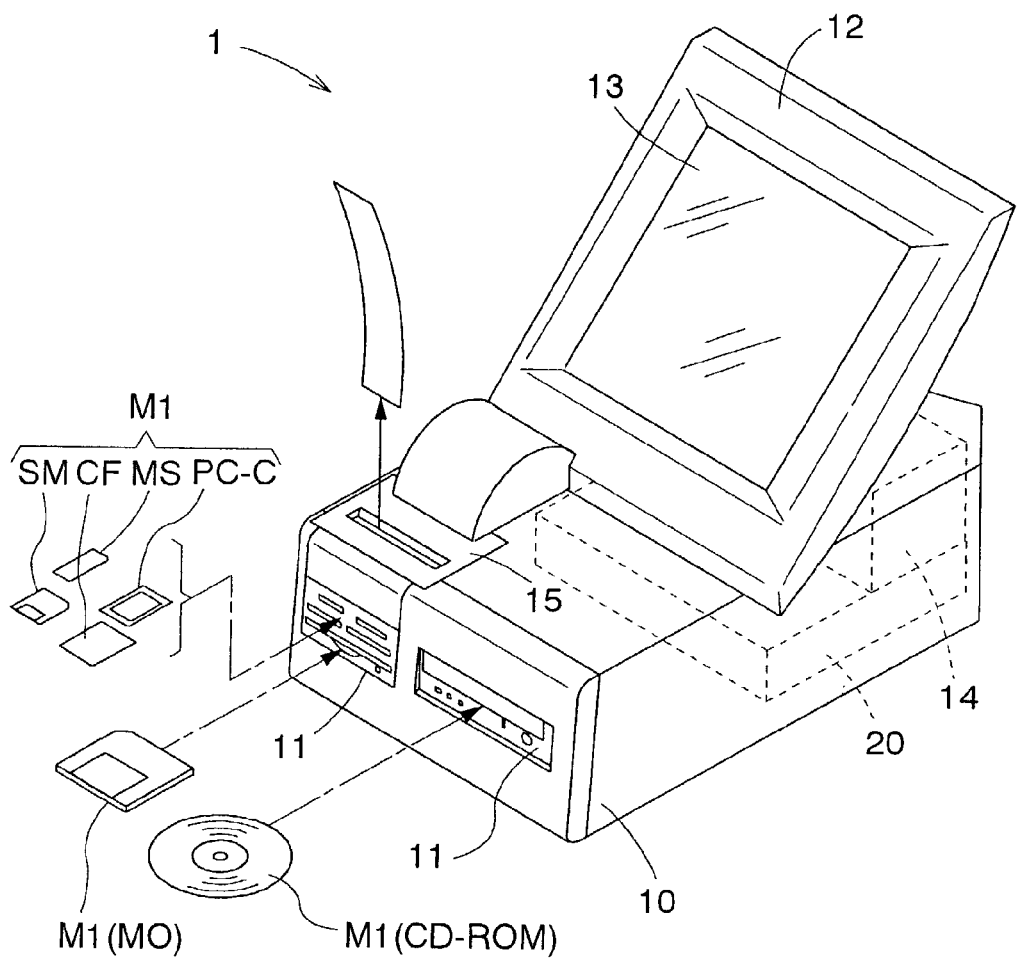
FIG. 2 is a perspective view of the receiving apparatus.

The receiving apparatus 1 will be described hereinafter. As shown in FIG. 2, each receiving apparatus 1 includes a case 10, and a liquid crystal display 12 mounted on an upper surface of the case 10 and defining a touch panel 13 on a display surface thereof. The case 10 has, arranged in a front surface thereof, a plurality of media drives 11 for receiving varied media M1 such as Smart Media SM, CompactFlash CF, memory sticks MS, PC cards PC-C acting as attachment to the media, CD-ROMs and MOs. A receipt printer 15 of the thermal transfer type is disposed on the upper surface of the case 10 forwardly of the display 12 for issuing order receipts. Further, the case 10 contains a controller 20 in the form of a general purpose computer acting as a data processing device of this receiving apparatus.

The functions of controller 20 are substantially the same as those of a general purpose computer having network functions. The controller 20 communicates information with the plurality of media drives 11 and touch panel 13, creates printing information from acquired image information and order information for use by the printing apparatus 3 to output prints, controls storage on a hard disk 14 acting as data storage unit, and controls the receipt printer 15. This controller 20 employs Windows 2000 of Microsoft Corporation as operating system (OS), and produces various functions needed by the receiving apparatus 1, by means of various programs provided by this operating system, and various programs created for operation on the operating system, and in cooperation attached hardware.

In this embodiment, the network 2 between the receiving apparatus 1 and between the receiving apparatus 1 and printing apparatus 3 is built by using a TCP/IP communication protocol included in this operating system. However, a different network protocol may be used. What is important here is that the hard disk 14 opened to the network 2 as a network drive, that is printing information is stored in a common folder and made accessible to the printing apparatus 3 and, according to circumstances, to the other receiving apparatus 1.

The controller 20 is connected through an I/O interface 21 with external devices such as media drives 11 and hard disk 14 provided for the receiving apparatus 1, and has various functions produced by hardware and software (programs). Those of the functions that concern this invention include, as shown in the functional block diagram of FIG. 3, an image information processing unit 22 for processing image information (photo image files and the like) taken from media M1 provided by customers through the media drives 11 and sent to a RAM 21, a display control unit 23 for displaying a variety of information on the display 12, an order information processing unit 24 for producing order information from print sizes and numbers of prints inputted by the customers which will be described in detail later, an order identification information applying unit 25 for creating a unique order number and a terminal ID specifying the receiving apparatus 1 as one example of order identification information each time a customer gives an order for prints, a printing information creating unit 26 for creating printing information including the above image information and order information, and hierarchically storing the printing information in the common folder on the hard disk 14, a receipt issue processing unit 27 for issuing through the receipt printer 15 receipts recording data such as customer names and printing charges besides the above terminal ID and order numbers, and a user input processing unit 28 for processing control signals inputted through the touch panel 13 and causing the controller to perform various functions.

When an order is processed in this receiving apparatus 1, the image information processing unit 22 acquires or creates thumbnail images (usually small images of about 160 by 120 pixels) from image information taken in through a media drive 11. When the customer gives a an order for prints while looking at the thumbnail images displayed on the display 12, the order information processing unit 24 creates order information.

Along with the display of the thumbnail images acquired from the image information on the display 12, the image data sizes acquired from the same image information also are displayed, in numerical values in this embodiment. That is, a data size in the form of the number of horizontal pixels by the number of vertical pixels is displayed as associated with a corresponding thumbnail image, e.g. to the lower right of the thumbnail image.

For this purpose, the image information processing unit 22 includes an image data size acquisition unit 22A and a thumbnail image processing unit 22B. The image data size acquisition unit 22A acquires sizes of image data included in the image information and serving as printing sources, i.e. sizes of image data proper or full-size image data. The thumbnail image processing unit 22B acquires thumbnail image data included in the image information and creates thumbnail image data for display, or creates thumbnail image data from the full-size image data when only inappropriate thumbnail images or no thumbnail images are included in the image information.

Further, the thumbnail image processing unit 22B includes a thumbnail image extracting unit 22b, a thumbnail image determining unit 22c and a thumbnail image creating unit 22d. The thumbnail image extracting unit 22b extracts thumbnail image data from the image information read from the medium M1 and sent to a first memory 21a of RAM 21, The thumbnail image determining unit 22c determines the sizes of the thumbnail image data extracted by the thumbnail image extracting unit 22b, and checks whether this thumbnail image data is appropriate for display on the display 12. The thumbnail image creating unit 22d creates thumbnail image data for display from the thumbnail image data or full-size image data included in the image information.

Figure 3:
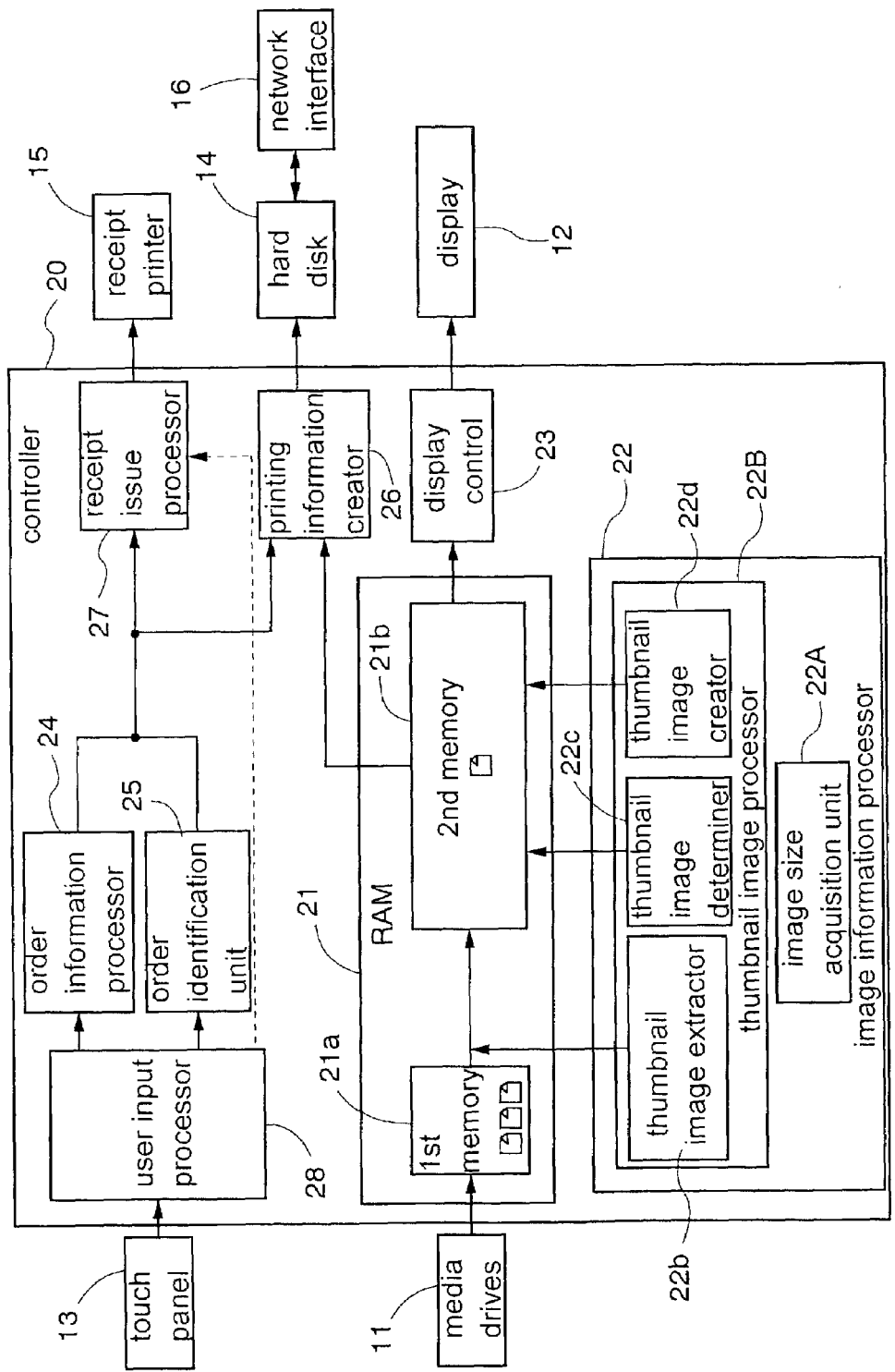
FIG. 3 is a functional block diagram illustrating functions of a controller of the receiving apparatus.
Figure 4:
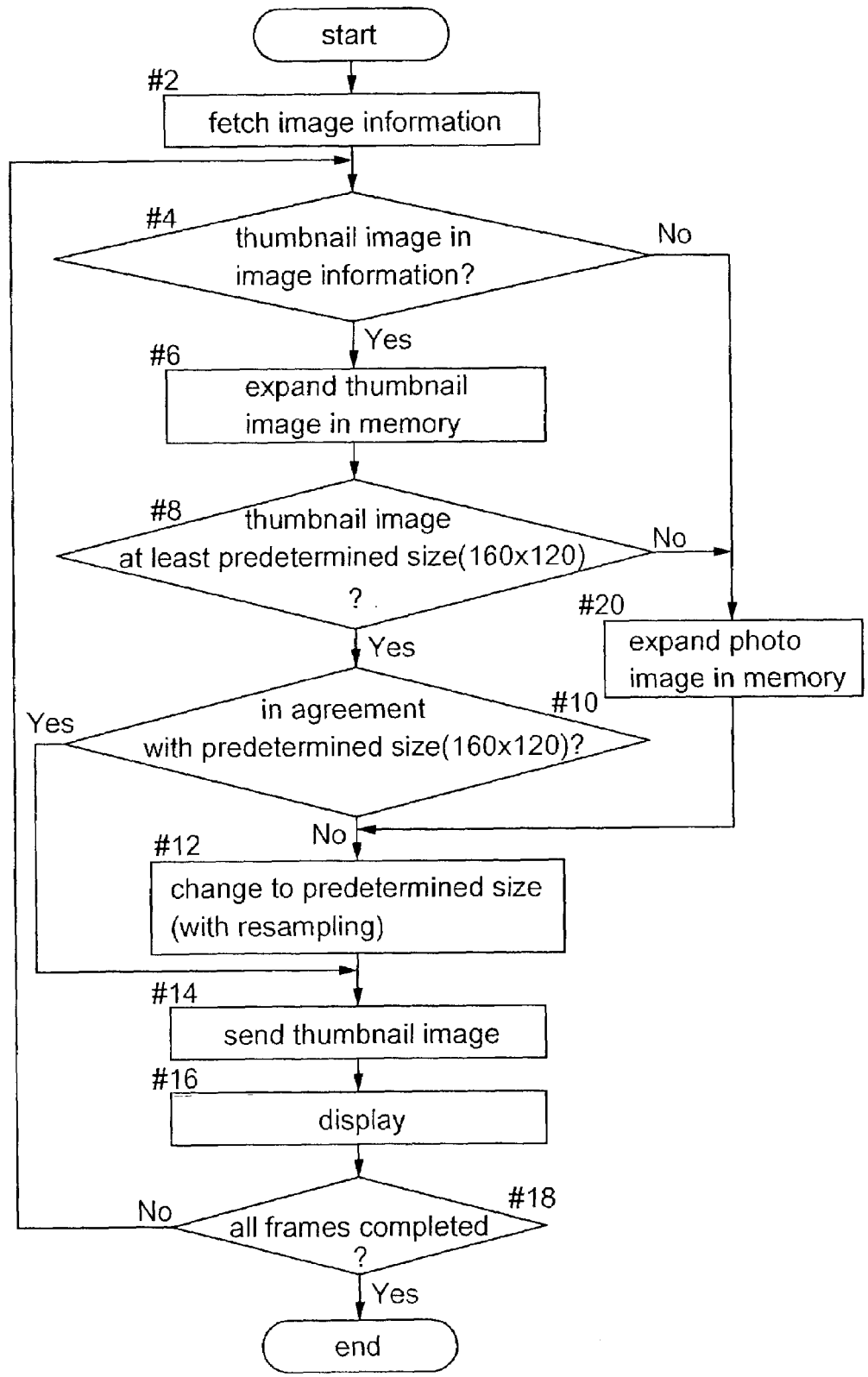
FIG. 4 is a flow chart of a sequence for creating thumbnail images for display.

Next, a procedure for creating thumbnail image data for display will be described with reference to the functional block diagram shown in FIG. 3 and the flow chart shown in FIG. 4.

When a customer sets a storage medium M1 to the media drive 11, image information (image file) stored in the medium M1 is loaded into the memory 21a (#2). First, the thumbnail image data extracting unit 22b accesses a first piece of image information, and checks whether a thumbnail image is included therein (#4).

When a thumbnail image is included (Yes from #4), the thumbnail image data is expanded in a second memory 21b. When, for example, the image information is an Exif file, a thumbnail image data area is secured in a data portion of TIFF format. Thus, a TIFF file of the thumbnail image may be created by directly connecting a thumbnail image portion immediately after the header of TIFF format, and may be expanded in the second memory 21b. Incidentally, in an Exif file, a JPEG image data area for full-size image data is secured after a data portion of TIFF format.

The thumbnail image data determining unit 22c checks whether the image data size of the thumbnail image data expanded in the second memory 21b has reached a criterion or not (#8). This checking is made in order to determine whether the image data size of the thumbnail image data fits with a predetermined size corresponding to a thumbnail image display area on a number of prints select screen described hereinafter. In this embodiment, the criterion is 160 by 120 pixels. However, the smaller the number of thumbnail images displayed on the number of prints select screen, the larger thumbnail images are used. It is therefore desirable that the image size serving as the criterion is changed where the number of thumbnail images displayed at a time on the display 22 is selectable.

When the image data size of the thumbnail image data is equal to or larger than the predetermined value (Yes from #8), a further checking is made whether the size of the thumbnail image data agrees with the predetermined size or not (the agreement here being a matter of substance, and a difference of several pixels being negligible) (#10). When the size of the thumbnail image data agrees with the predetermined size (Yes from #10), the thumbnail image data is sent as it is, and as thumbnail image data for display, to the display control unit 23 (#14), and is displayed in a suitable area on the display (#16). When the size of the thumbnail image data disagrees with the predetermined size (No from #10), the thumbnail image creating unit 22d resamples (i.e. thins out) this thumbnail image data to reduce to the predetermined display size (#12). Then, the image data is subjected to steps #14 et seq.

When the checking at #4 or #8 results in "No", the image information includes no thumbnail image data, or the thumbnail image data included is not fit for use. The full-size image data (e.g. JPEG image data in an Exif file) is expanded from the image information into the second memory 21b (#20). The thumbnail image creating unit 22d resamples (i.e. thins out) this full-size image data to reduce to the predetermined display size (#12). Then, the image data is subjected to steps #14 et seq.

In any case, when the thumbnail image of the image information is displayed, the operation proceeds to a next step. When further image information remains to be subjected to the thumbnail image processing (No from #18), the operation returns to #4 to repeat the processing. When all the image information has been processed (Yes from #18), the operation is terminated.

Figure 5:
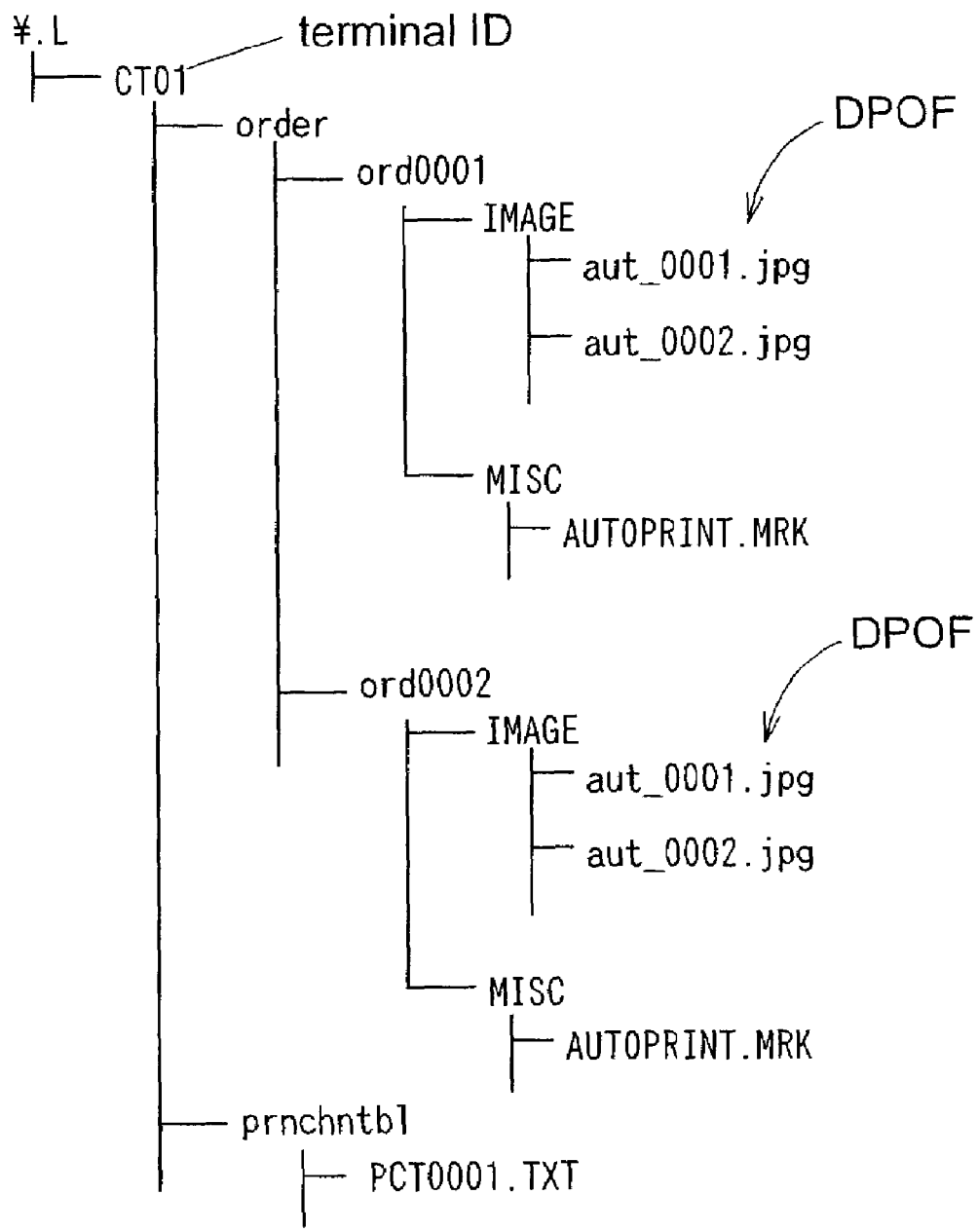
FIG. 5 is an explanatory view illustrating a directory structure for printing information storage on a hard disk of the receiving apparatus

Next, a typical example of printing information hierarchically stored in the common folder of hard disk 14 by the function of the printing information creating unit 26 will be described with reference to FIG. 5. In this example, as seen from FIG. 5, the hard disk 14 acting as network drive has a drive name "L" is allocated thereto, and has a common folder created and given the terminal name of this receiving apparatus 1 (terminal ID), i.e. "CT01". Below this, a directory "order" is provided. Below this, folders (=directories) under the name of unique order numbers created by the identification information applying unit 25 are provided, each folder storing image information and order information concerning printing output, basically in the file format of DPOF (Digital Print Order Format), in separate IMAGE directory and MISC directory. By such a directory management, the operator of the printing apparatus 3 having received a receipt determines, from the terminal ID and order number, a directory to be accessed for a printing operation. The image information serving as printing source may readily be retrieved from the IMAGE directory, and the order information such as a print size and the number prints from the MISC directory. It is of course possible to perform this information retrieving operation automatically.

FIG. 6 shows one example of receipts issued to the customers based on the data created by the receipt issue processing unit 27 and through the receipt printer 15. In this example, the receipt is continuous with a copy for customer's keeping that records substantially the same contents. The customer may split the slip in the middle and had the receipt to the operator of the printing apparatus 3, and keeps the other half, i.e. the copy. Recorded on the receipt are the customer's name and address (or telephone number), the terminal ID that specifies the receiving apparatus 1 having received this printing order, an order number, a print size such as L or 2L, the number of prints to be made, a charge for this printing order, and so on.

[Printing Apparatus]

Figure 7:
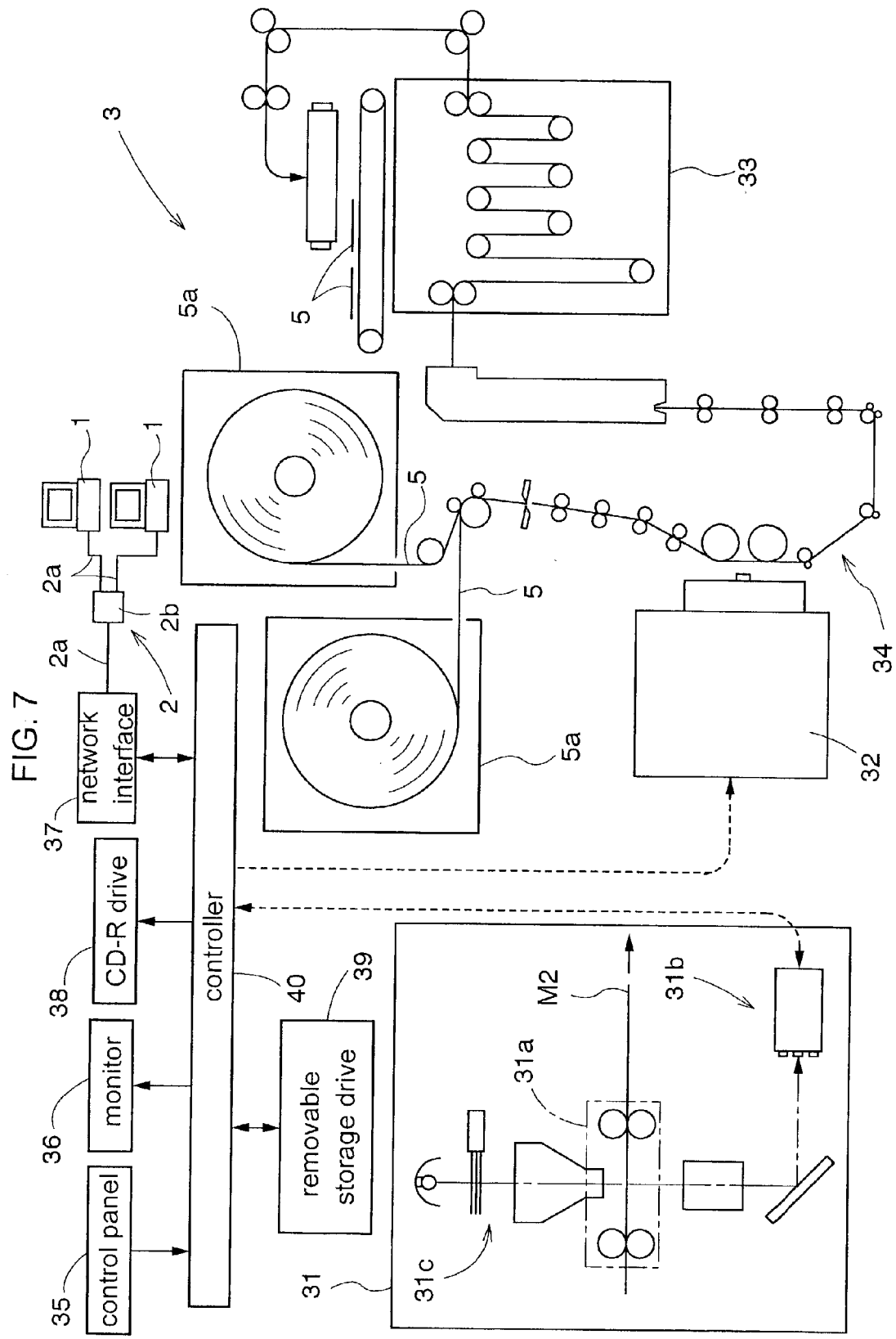
FIG. 7 is a block diagram schematically showing a printing apparatus forming part of the printing system.

The photo printing apparatus 3 will be described hereinafter. As seen from FIG. 1, This photo printing apparatus 3 includes a main apparatus body having a case 30 integrating an operation unit formed on a table and a developing section, and a scanner unit 31 disposed in a position separated from the main apparatus body. As will be understood from FIGS. 1 and 7, the main apparatus body houses an exposing unit having a digital type print head 32 for printing images on printing paper 5 transported by a paper transport mechanism 34 from a paper magazine 5*a* and cut to a print size. The developing section includes a developing tank 33 for developing the printing paper exposed by the print head 32. The printing paper 5 developed in the developing tank 33, dried, and placed on a transverse feed conveyer. The printing paper 5 is transported from the transverse feed conveyer to a sorting conveyer. The print head used herein in the type that emits a scanning laser beam in a direction perpendicular to a direction of transport of printing paper 5. Other types of print head may be used, such as the fluorescent beam type, liquid crystal shutter type, DMD type and FOCRT.

The operation unit includes a control panel 35 having a keyboard and a mouse, and a monitor 36 for displaying various control information and simulation image for pre judgment. Further, a CD-R drive 38 is provided for printing image information acquired by the receiving apparatus 1 on recording media such as CD-Rs.

As described in detail later, to cope with a case of transferring printing information from the receiving apparatus 1 to the printing apparatus 3 off-line by means of removable storage media, a removable storage drive 39 is provided for reading from removable storage media the printing information collected from the receiving apparatus 1.

The scanner unit 31 includes a film carrier 31*a* changeably mounted on an upper surface of a case with casters attached to the bottom thereof, and a photoelectric converter 31*b* mounted in the case and having photoelectric conversion elements such optical lenses and CCDs. An arm is provided for leading a light beam from a light source 31*c* mounted in the case through an optical fiber to an upper surface of the film carrier 31*a*. For scanning a photo film M2, may it be a negative film or positive film, the film M2 is set to the film carrier 31*a* which is moved at a predetermined speed, and a light beam is emitted from the forward end of the arm. The photoelectric converter 31*b* converts image information in each frame of photo film M2 into digital signals which are forwarded to the main apparatus body.

Further, the printing apparatus 3 has a controller 40 in the form of a general purpose computer mounted in the case 30 to act as a data processing device of this printing apparatus 3. This controller 40 also employs Windows 2000 of Microsoft Corporation as operating system (OS), and produces various functions needed by the printing apparatus 3, by means of various programs provided by this operating system, and various programs created for operation on the operating system, and in cooperation attached hardware. The controller 40 is in network connection to the two receiving apparatus 1 through a network interface 37.

Figure 8:
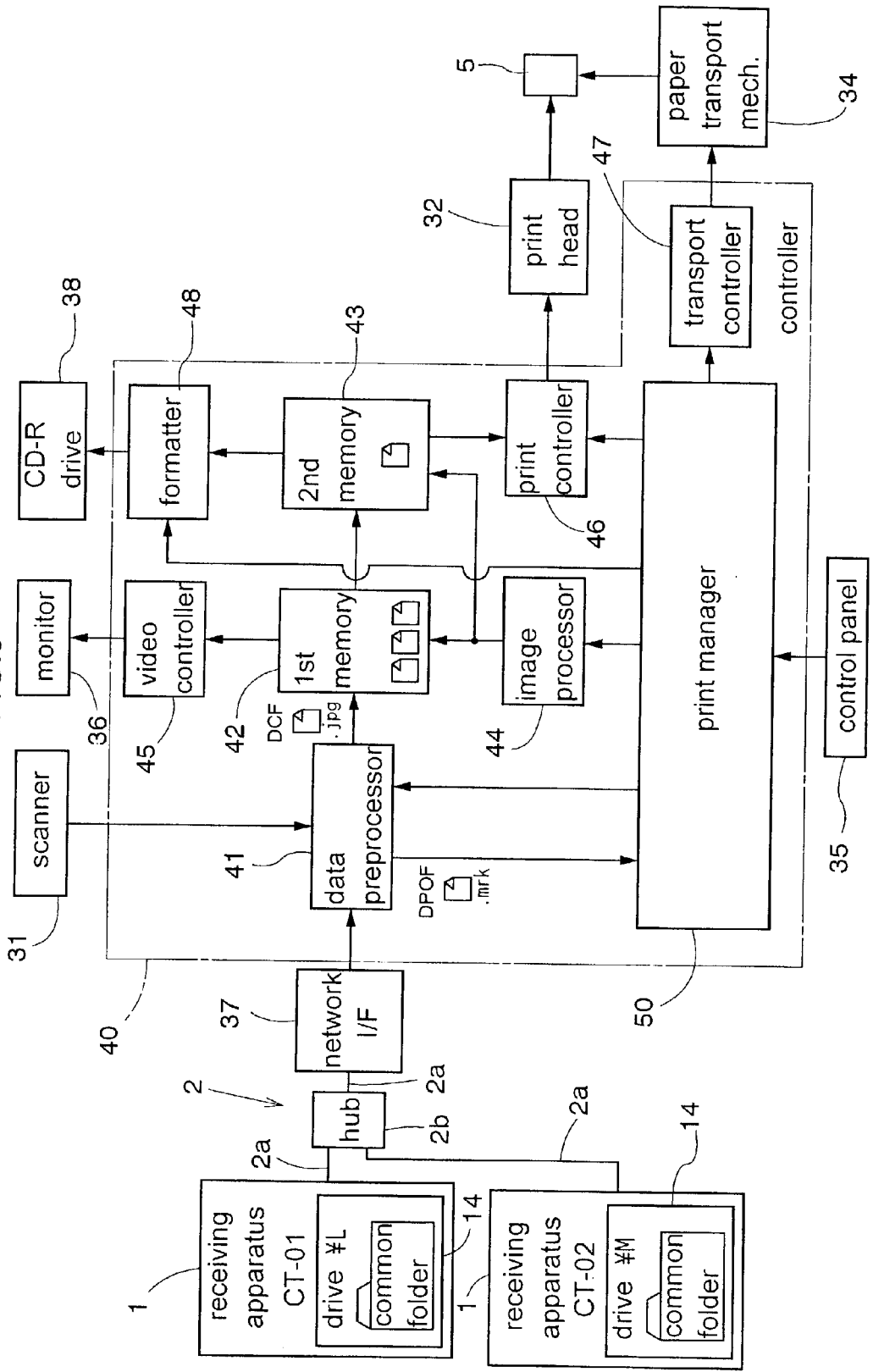
FIG. 8 is a functional block diagram illustrating functions of the controller of the receiving apparatus.

The controller 40 has functions produced by hardware and software (programs). Those of the functions that concern this invention include, as shown in the functional block diagram of FIG. 8, a data preprocessing unit 41 for acquiring, through the network 2, printing information stored on the hard disk of receiving apparatus 1 from a folder (directory) identified by a predetermined order number, dividing the printing information into image information and order information, and sending the image information to a first memory 42 and order information to a print manager 50, an image processing unit 44 for successively transferring image data to a second memory 43 frame after frame from the image information sent to the first memory 42 and performing an image processing such as color correction, a video controller 45 for generating video signals of simulation images serving as expected print images and other correction information in time of a pre-judge operation such as color correction and sending the video signals to the monitor 36, a print controller 46 for controlling the print head 32 based on image data resulting from the image processing, a transport controller 47 for controlling the paper transport mechanism 34 for transporting the printing paper 5 exposed by the print head 32. and developed in the developing tank 33, and a formatter 48 formatting the image data resulting from the image processing to write the data on a CD-R again according to the order number as requested by the customer. Image information acquired by the scanner 31 also is sent to the data preprocessing unit 41. After receiving a suitable scan data preprocessing, the information is sent to the second memory 43 through the first memory 42, and ultimately used in making prints 5.

The print manager 50 has a core function for controlling the printing apparatus 3 to make the number of photo prints in the print size ordered by the customer from the image information sent to the data preprocessing unit 41, based on the order information from the receiving apparatus 1 or order information inputted through the control panel 35.

[Reception Processing at Receiving Apparatus]

Figure 9:
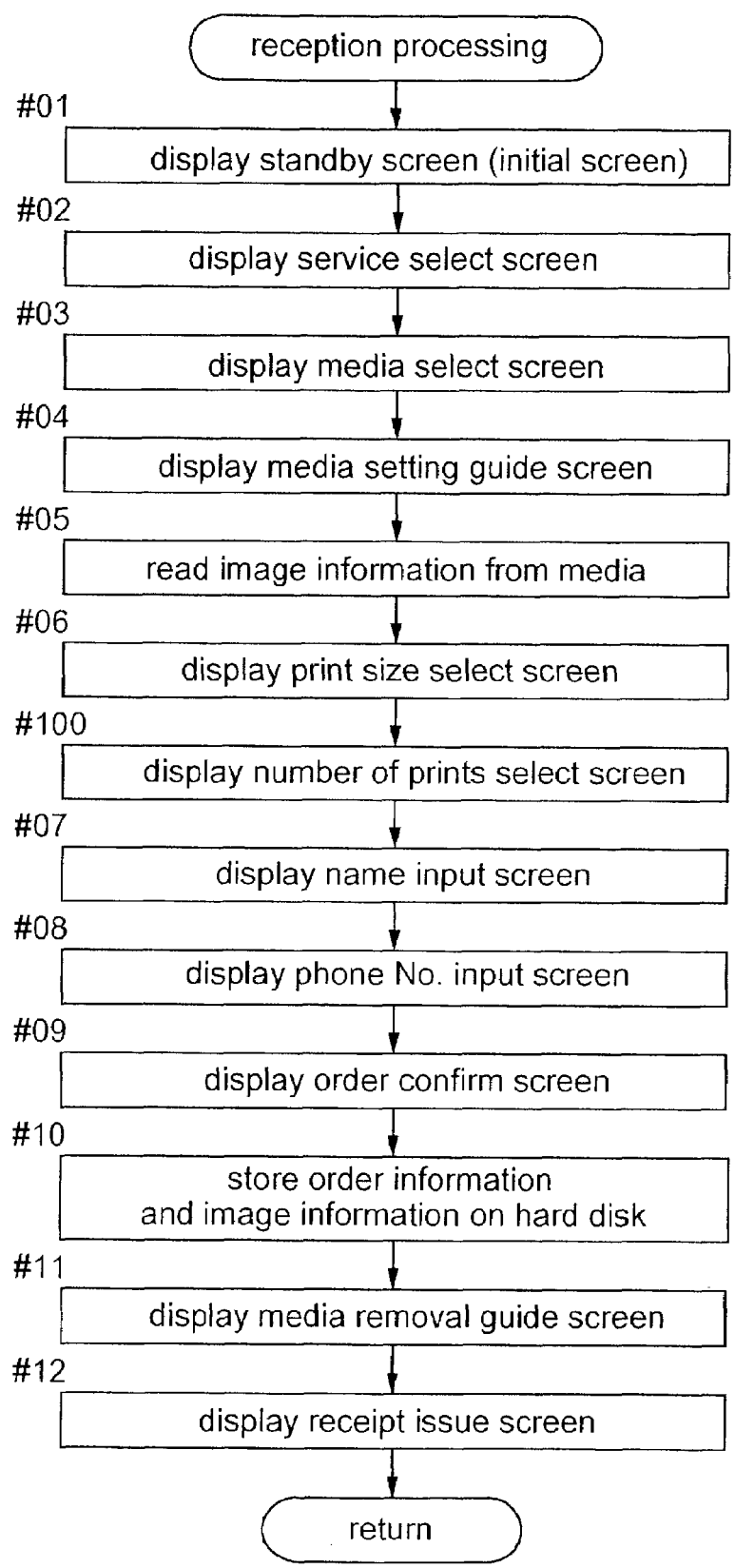
FIG. 9 is a flow chart of an operating sequence in time of receiving an order.

Reception processing at the receiving apparatus 1 is performed in interaction with the customer through the display 12. FIG. 9 shows a flow chart illustrating changes of screens successively displayed on the display 12. The reception processing will be described next with reference to this flow chart.

First, in the state of standby, the display 12 shows a standby screen including the functions of the receiving apparatus 1, a logo mark of the photo processing shop and the like (#01). When ordering photo prints, the customer places a finger on the touch panel 13 on the display 12, which causes a "service select screen" to be displayed (#02). This screen shows a message "Please select services.", a print order reception switch, and a media save reception switch (the service of writing data to a CD-R or the like), and prompts the customer to make selections.

When the print order reception switch is operated on the "service select screen", a "media select screen" is displayed next (#03). The "media select screen" shows a message "Please select medium." and a plurality of switches for selecting media M1, and prompts the customer to make a selection. When the customer touches a switch corresponding to a medium M1 used, a next process is executed. The "service select screen" includes, shown in lower positions thereof, a stop button for discontinuing the processing, and a return button for returning to the previous stage of processing. These stop button and return button are shown in the same positions in the subsequent processing described hereinafter, and perform the same functions.

Next, a "media setting guide screen" is displayed (#04). This screen shows a message "Please set medium and press OK button." and specific images for setting a corresponding medium M1. When the customer sets the medium M1 to a media drive and operates the OK button, image information is read from the medium M1 (#05), and then a next processing is executed.

After the medium M1 is set following the "media setting guide screen", a "print size select screen" is displayed (#06). This screen shows a message "Please select print size." and size specifying switches corresponding to a plurality of print sizes. Each size specifying switch includes characters "L size", "2L size" or the like indicating a print size, numerical values indicating the print size, a unit price of prints and a basic charge for printing. When one of the size specifying switches is operated, a next processing is executed.

Subsequently, the "number of prints select screen" is displayed (#100). This screen shows a message "Please select the number of prints." and a plurality of thumbnail images created from image information read from the medium M1. The screen further includes besides the stop button and return button shown in lower positions thereof, a "next" button acting as a display button. The screen includes also an information area shown in a lower middle position thereof. Where there is a further number of prints select screen with thumbnail images, a shift is made to the next screen by pressing the "next" button. If what is displayed is the final screen, a shift is made to the next step by pressing the OK button shown on the screen.

Figure 10:
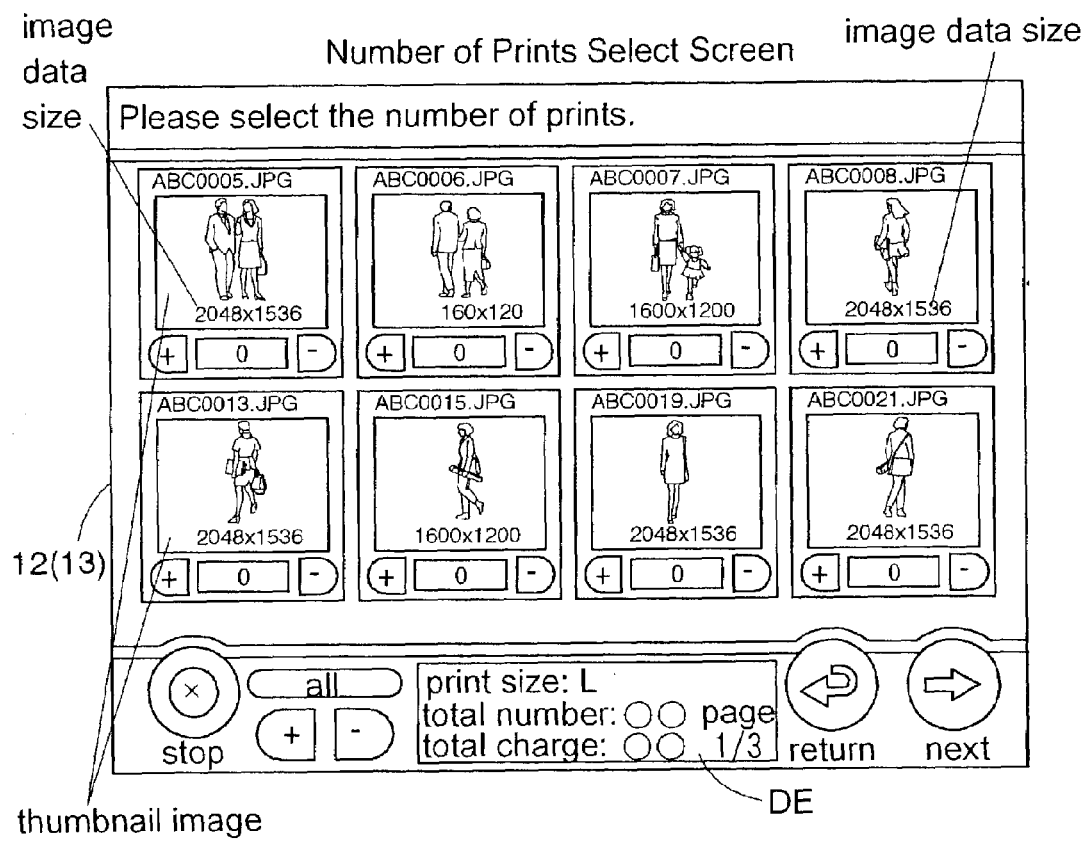
FIG. 10 is a view of a display screen showing one form of number of prints setting screen.

FIG. 10 shows one example of number of prints select screen with thumbnail images. This screen shows, in table form, six thumbnail images for display created by the sequence described with reference to FIGS. 3 and 4. Each thumbnail image includes, in a lower right position thereof, an image data size acquired by the image data size acquisition unit 22A and shown in the form of the number of horizontal pixels by the number of vertical pixels.

On the number of prints select screen, the numerical value in a number of prints display area in the frames of all thumbnail images is initially set to "0". The number of prints is incremented by one by operating a plus button, and decremented by one by operating a minus button. The number of prints selected in this way is displayed in the number of prints display area.

After selecting the numbers of prints for all image information, an operation for setting the numbers of prints is completed by operating the OK button. Then, the order information processing unit 24 creates order information.

As a next stage of processing, a "name input screen" is displayed (#07). This screen shows a message "Please input your name." and an input board including a name display portion and a keyboard. After the name is inputted, a "telephone number input screen" is displayed as a next stage. This screen shows a message "Please input your telephone number." and an input board including a telephone number display portion and a keyboard (#08). The customer then touches the keyboard and to input a telephone number. Then, the operation proceeds to a next stage.

The process of inputting the customer's name and telephone number is not essential for printing purposes. A processing mode may be set to proceed to the next stage even when no such input is made. However, it is reasonable to set a processing mode such that, when the customer's name is not inputted, a number or sign created by the receiving apparatus 1 is inputted automatically.

As the next stage of processing, an "order contents confirm screen" is displayed as shown in FIG. 11 (#09). This screen shows a message "Please confirm contents of the order." and a table showing details of the print output order inputted by the customer through the receiving apparatus 1, along with fees therefore. When no error is found in the contents displayed, the customer operates the OK button. Then, the order information and image information are stored in the directory affixed with the order number of this printing output order on the hard disk 14 (#10). That is, the printing information creating unit 26 stores the order information and image information created by the order information processing unit 24 in the directory (FIG. 5) created based on the order number given by the order identification information applying unit 25.

Next, a "media removal guide screen" is displayed (step #11). This screen shows a message "Please remove medium." When the customer removes the medium M1 following this message and operates the OK button, the operation proceeds to a next stage. When the customer operates the OK button without removing the medium M1, an alarm is given in electronic sound to indicate the wrong operation.

Figure 12:
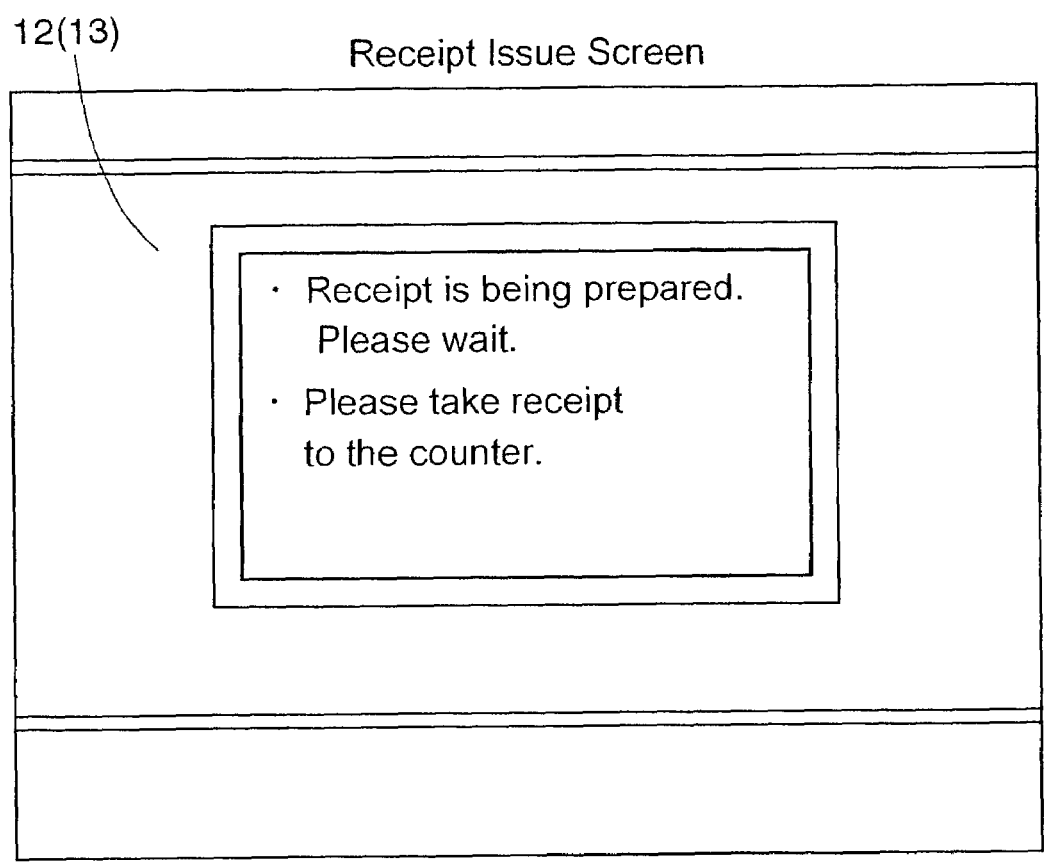
FIG. 12 is a view of a display screen showing one example of operating screen in time of receiving an order.

As the next stage of processing a "receipt issue guide screen" is displayed as shown in FIG. 12 (#12). This screen shows messages "Receipt is being prepared. Please wait." and "Please take receipt to the counter." Upon lapse of a predetermined time, the printer prints out a receipt as shown in FIG. 6. With the receipt issued this way, the reception processing is completed, and the initial screen is reinstated.

As described above, by using the receiving apparatus 1, the customer can carry out a required operation following the messages appearing on the display 12. Moreover, after setting a storage medium M1 such as Smart Media or CompactFlash storing image information acquired with a digital camera, or a CD-ROM or MO storing image information made by the customer, the customer may readily select images to be printed by looking at the thumbnail images shown on the display 12. When the customer produces a receipt issued in time of reception proceeding to a shop assistant at the service counter, the shop assistant may confirm that the print output order has been received.

What is claimed is:

1. A digital image receiving apparatus comprising:
   a media drive for reading image information from a storage medium;
   a display for displaying a variety of information;
   an image information processing unit for processing the image information to display a plurality of images in the image information read by the media drive, in thumbnail image form on the display;
   an order information processing unit for creating order information including which images to be printed from a printing order given by a customer for each thumbnail image displayed on the display;
   a thumbnail image determining unit for determining the image data size of thumbnail image data included in said image information exceeds or is equal to or is below a predetermined display size corresponding to a thumbnail image display area displayed on the display; and
   a thumbnail image creating unit for creating thumbnail image data for display by thinning out from the thumbnail image data for the image information with the thumbnail image data determined as having an image data size exceeding said predetermined display size by said thumbnail image determining unit, and creating thumbnail image data for display from full-size image data included in the image information for the image information with the thumbnail image data determined as having an image data size below said predetermined display size by said thumbnail image determining unit.

2. A digital image receiving apparatus as defined in claim 1, wherein, when said image information processing unit determines that no thumbnail image data is included in said image information, said thumbnail image creating unit creates thumbnail image data for display from the full-size image data included in the image information.

* * * * *